3,101,754
SAWMILL LUMBER SORTING APPARATUS
Clifford L. Stupfel, Seattle, Wash., assignor to Crown Zellerbach Corporation, San Francisco, Calif., a corporation of Nevada
Filed Mar. 28, 1961, Ser. No. 98,850
6 Claims. (Cl. 143—157)

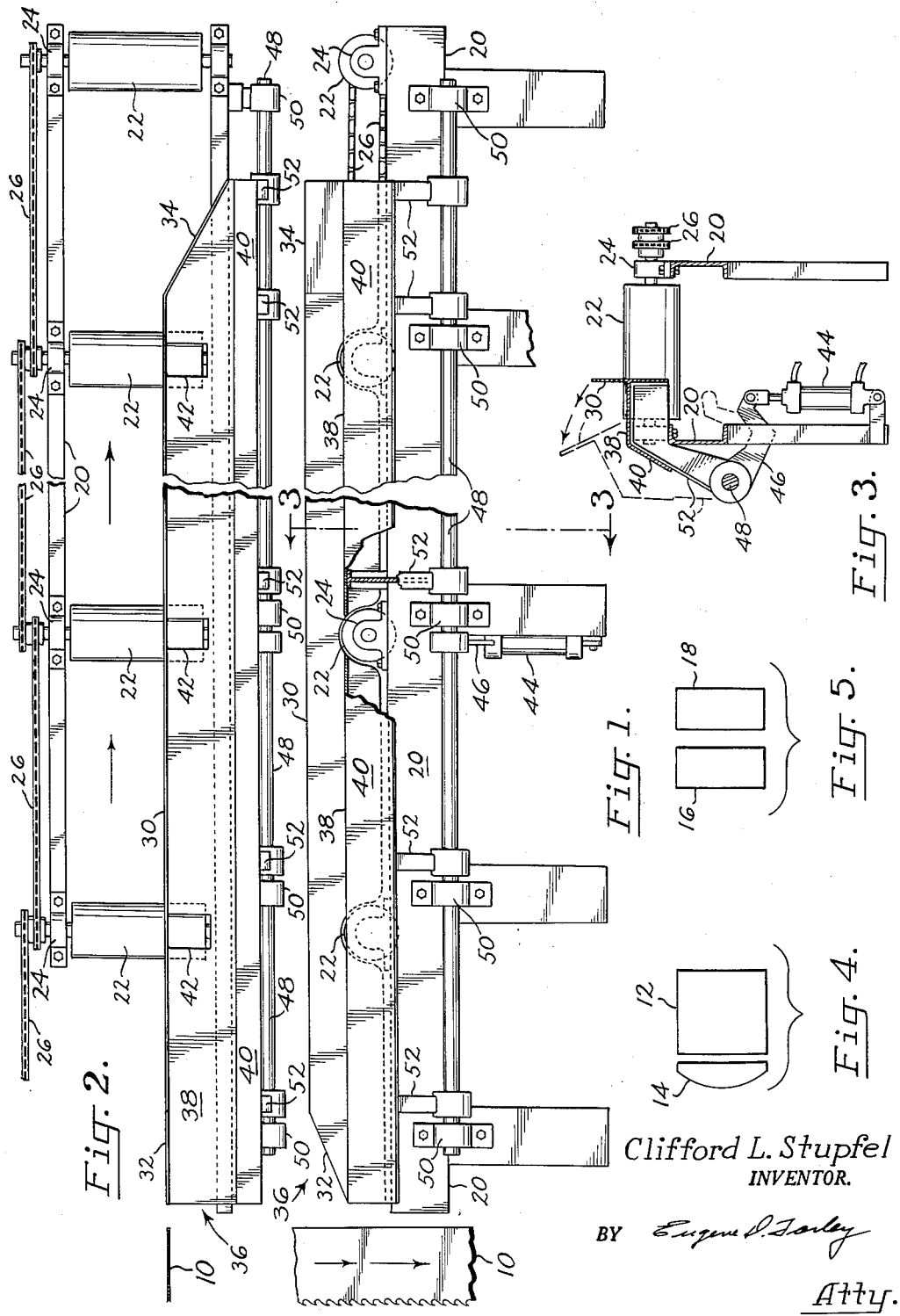

This invention relates to sawmill lumber sorting apparatus. It relates particularly to apparatus for separating and sorting freshly sawn lumber pieces, one of which may be a slabwood piece.

In conventional sawmill practice, the product resulting from the primary log break-down is run through a resaw for further subdivision into lumber and slabwood. These two products are carried by an offbearing conveyor to sorting stations where they are separated manually. The lumber pieces are passed to further manufacturing operations, or storage, while the slabwood is transferred to a chipper or to the refuse burner, depending upon whether the logs have been barked. Large slabwood pieces containing usable lumber are recycled for further breakdown.

It is the general object of this invention to provide apparatus which may be stationed immediately behind the saw for sorting out slabwood pieces from the lumber pieces when the slabwood is to be chipped or burned, or for conveying away the slabwood pieces with the lumber pieces when the slabwood contains usable material and is to be processed further. These operations are carried out automatically, without the employment of sorting personnel and while the lumber is being conveyed on the mill line at the usual production rate.

The manner in which the foregoing and other objects of this invention are accomplished will be apparent from the accompanying specification and claims considered together with the drawings, wherein:

FIGS. 1 and 2 are fragmentary side elevational and plan views respectively of the herein described lumber separating apparatus, FIG. 1 being partly broken away to show the interior construction;

FIG. 3 is a sectional view taken along line 3—3 of FIG. 1; and

FIGS. 4 and 5 are end views of sawn lumber pieces of the character which may be processed by the apparatus of FIGS. 1–3.

In general, the sawmill lumber separating apparatus of my invention comprises offbearing conveyor means adapted to be stationed immediately behind a saw for receiving longitudinally arranged lumber pieces, one of which may be a slabwood piece. Divider means are aligned with the saw and placed for entering the saw kerf between the pieces, thereby separating them as they travel along the conveyor. Guide meanas are provided for guiding the piece on one side of the divider laterally with respect to the conveyor, thus sorting it out. Shifting means also are provided for shifting the divider from an operative position in which it accomplishes its sorting function to an inoperative position wherein the total output of the saw is passed along the conveyor.

Considering the foregoing in greater detail and with particular reference to the drawings:

In its normal application the herein described apparatus is intended for use with a resaw comprising a band saw, the blade of which is indicated at 10 in FIGS. 1 and 2. By use of this saw there may be produced a variety of products such as are indicated in FIGS. 4 and 5. Thus, in the example illustrated in FIG. 4, there are produced a cant 12 and a slabwood piece 14. In the situation illustrated in FIG. 5 there are produced two pieces of lumber 16, 18. As indicated above, it is a desirable practice to send slabwood piece 14 to the chipper if the log is barked, or to the waste burner if the log is unbarked. In the alternative, if the slabwood piece contains usable lumber it is forwarded together with cant 12 along the production line for further processing.

To achieve automatically the sorting operation by which the foregoing alternatives are accomplished there is stationed immediately behind saw 10 an offbearing conveyor having a frame 20 and comprising a plurality of spaced live rolls 22 journaled in bearings 24 and driven from a common power source at a uniform rotational speed through chain and sprocket assemblies 26.

Mounted on the frame of conveyor 20 are divider and guide means for separating pieces such as pieces 12, 14 of FIG. 4 and, at the option of the operator, automatically sorting out the slabwood piece 14.

The divider means comprises an upright plate 30 which is in substantial alignment with saw blade 10 and extends longitudinally of the conveyor a distance determined in part by the length of the lumber pieces to be processed.

The width of divider 30 is such that it may be inserted in the kerf produced by saw blade 10. Its leading edge 32 is angled upwardly to prevent jamming of the lumber pieces. Its terminal portion 34 is angled laterally outwardly at an appropriate angle, e.g. one of 45°, to provide a guiding section which assists in sorting out the pieces.

Immediately adjacent, and preferably affixed to divider 30, is a guide plate 36 which extends longitudinally of the conveyor a distance commensurate with the extent of divider 30. Guide plate 36 preferably is formed in two sections. The first section is a horizontal section 38 and the second a downwardly inclined section or apron 40. Guide section 34 of divider 30 extends laterally a distance sufficient to reach a least to the line of division between guide plate sections 38, 40.

Divider 30 and guide plate 36 overlie live rolls 22 for a substantial portion of the width of the latter. The plane of section 38 of guide plate 36 is below the plane of the top of the rolls. Accordingly, there are provided recessed or cutaway areas 42 in the divider and guide plate of sufficient extent to accommodate the ends of the rolls, as is shown particularly in FIG. 2. In this manner there are furnished live roll segments on each side of divider 30.

Means are provided for shifting divider 30 and guide plate 36 from the operative position of FIGS. 1 and 2 to an inoperative position, i.e. the dotted line position of FIG. 3.

In the illustrated form of the invention, such means are driven by a fluid operated cylinder, specifically a double acting air cylinder 44, mounted on the frame of the conveyor. The piston rod of the cylinder is coupled (FIG. 3) to one end of an angular lever 46, the other end of which is fixed to a rock shaft 48.

The latter member of the assembly is journaled in bearings 50, to which are affixed a plurality of spaced, parallel arms 52. These arms, in turn, are fastened to and support guide plate 36 and divider 30.

*Operation*

The operation of the above described apparatus is as follows:

Assume that saw 10 saws pieces such as are illustrated in FIGS. 4 and 5, such pieces being produced continuously in random sequence during the daily operation of the mill. In the event that a lumber piece 12 and slabwood piece 14 are produced, as indicated in FIG. 4, the apparatus is maintained in the position of FIGS. 1 and 2, with divider 30 aligned with saw 10. As the work passes through the saw in the direction of conveyor 20, divider 30 enters into the kerf or space between the freshly sawn pieces.

Continued advancement of the work results in transfer of the pieces to live rolls 22. Lumber piece 12, which it is desired to save, rests on the rolls outside the divider.

Slabwood piece 14, which it is desired to discard, rests on the rolls inside the divider on horizontal section 38 of guide plate 36.

The two pieces progress in this manner until they are completely free of the saw. Slabwood piece 14 then meets outwardly angled guide section 34 of the divider. This section guides the slabwood piece, still driven by rolls 42, laterally until it is beyond the side edge of the conveyor. Thereupon, it drops down along apron 40 into suitable collecting means which may be, for example, a hopper placed above a conveyor leading to the waste burner.

In the event that slabwood piece 14 contains usable lumber, or in the event that two pieces of lumber such as pieces 16, 18 of FIG. 5 are formed by the sawing operation, the sawyer operates double acting cylinder 44 to move lever arm 46, and hence the divider and guide plate assembly, to the dotted line position of FIG. 3. When this is done, both of the sawn pieces will be carried by the live rolls along the production line for further processing. In this manner, semi-automatic sorting of the output of the saw is achieved without the inclusion in the production line of the conventional sorting stations and sorting personnel.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. Sawmill lumber sorting apparatus comprising off-bearing conveyor means adapted to be stationed immediately behind a saw for receiving longitudinally arranged lumber pieces, one of which may be a slabwood piece, elongated divider means arranged in operative position overlying the conveyor means and aligned with the saw and placed with its infeed ened adjacent the saw for entering the saw kerf between the pieces, thereby separating them as they travel along the conveyor means, guide means on the outfeed end of the divider means spaced from the saw a distance greater than the length of lumber to be cut and extending angularly from the divider means to a location beyond one side edge of the conveyor means for guiding the piece on one side of the divider means laterally away from the piece on the other side of the conveyor means, and divider and guide shifting means supporting the divider and guide means for shifting them between said operative position and an inoperative position displaced laterally from the conveyor means.

2. Sawmill lumber sorting apparatus comprising off-bearing conveyor means adapted to be stationed immediately behind a saw for receiving longitudinally arranged lumber pieces, one of which may be a slabwood piece, an upright elongated divider plate arranged in operative position overlying the conveyor means and aligned with the saw end placed with its infeed end adjacent the saw for entering the space between the pieces, thereby separating them as they travel along the conveyor means, a guide plate extending horizontally along side the lower margin of the divider plate, the divider plate terminating at its outfeed end in an angled guide section spaced from the saw a distance greater than the length of lumber to be cut and directed across the guide plate to a location beyond the side edge of the conveying means, and shifting means supporting the divider and guide plates for shifting them between said operative position and an inoperative position displaced laterally from the conveyor means.

3. The sawmill lumber sorting apparatus of claim 2 wherein the horizontal guide plate is provided with a downwardly angled apron section extending alongside the conveyor means.

4. The sawmill lumber sorting apparatus of claim 2 wherein the conveyor means comprises a live roll assembly and wherein the divider and guide plates overlie the live rolls below the plane thereof and are cut away opposite the rolls to provide live roll sections on both sides of the divider plate.

5. The sawmill lumber sorting apparatus of claim 2 wherein the shifting means comprises a rock shaft extending parallel to the divider plate, a plurality of parallel lever arms extending outwardly from the rock shaft and mounting the divider and guide plates, and drive means connected to the rock shaft for rocking the arms and the plates carried thereby between said operative and inoperative positions.

6. The sawmill lumber sorting apparatus of claim 5 wherein the drive means comprises a fluid-operated cylinder.

References Cited in the file of this patent
UNITED STATES PATENTS

| | | |
|---|---|---|
| 752,440 | Davies | Feb. 16, 1904 |
| 1,867,873 | Browne | July 19, 1932 |
| 2,702,567 | Smith | Feb. 22, 1955 |
| 2,821,301 | Montague | Jan. 28, 1958 |
| 3,017,909 | Bowling et al. | Jan. 23, 1962 |